Dec. 12, 1961  J. KELLY  3,012,840
STRIP CAMERA AND TIMER AND PHOTOGRAPHS PRODUCED THEREBY
Filed Sept. 8, 1959  4 Sheets-Sheet 1
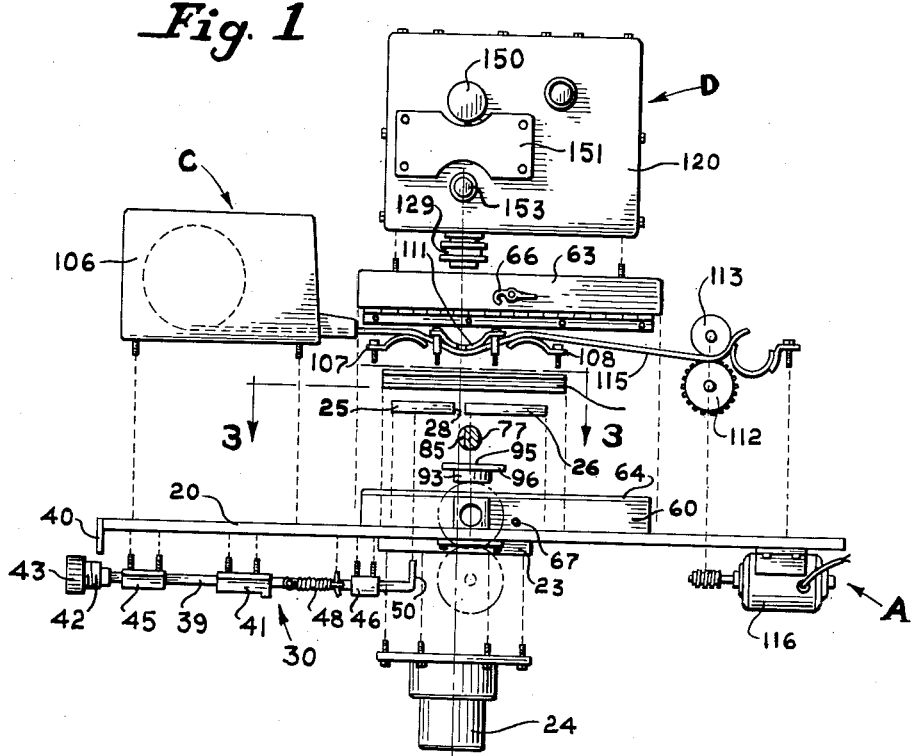
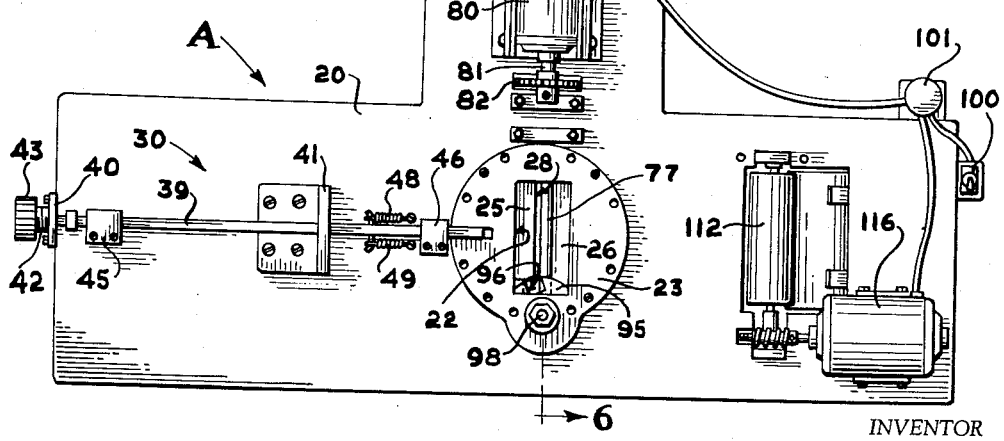
INVENTOR
JOHN KELLY
BY
ATTORNEYS Dec. 12, 1961  J. KELLY  3,012,840
STRIP CAMERA AND TIMER AND PHOTOGRAPHS PRODUCED THEREBY
Filed Sept. 8, 1959  4 Sheets-Sheet 2
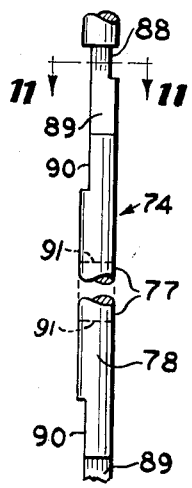
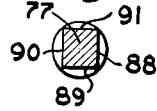
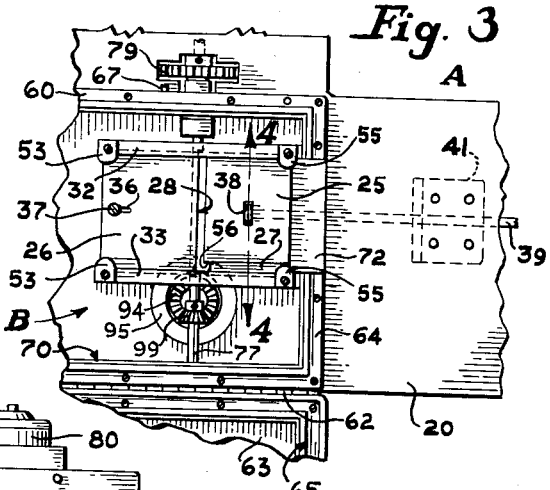
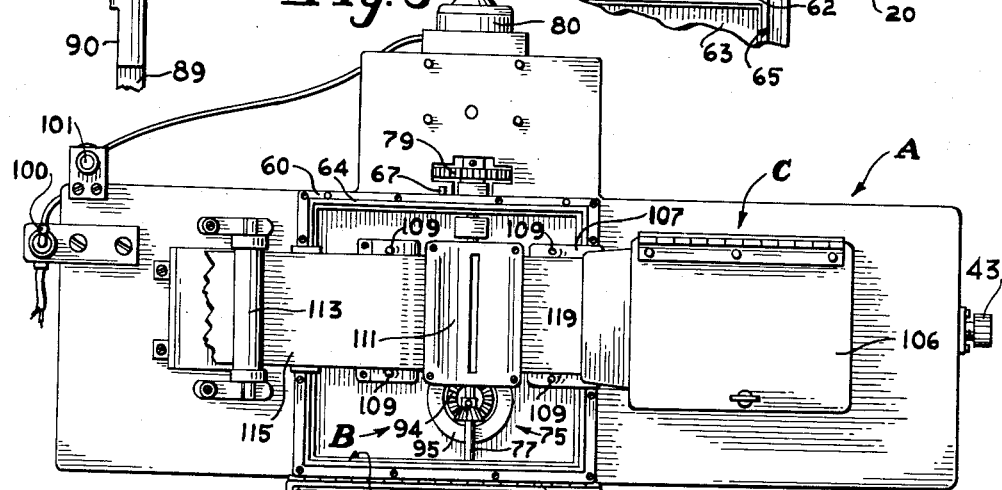
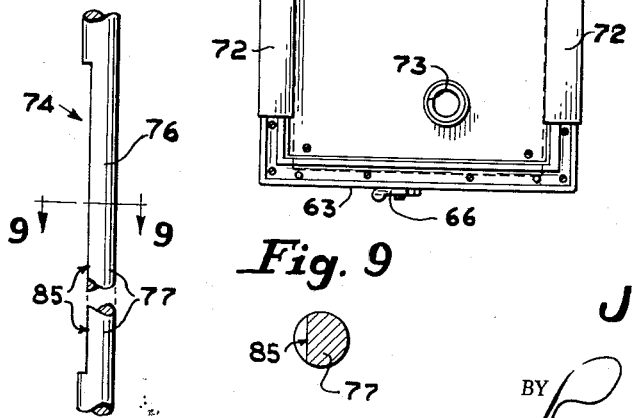
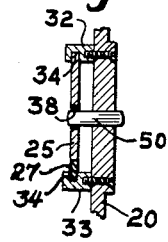
INVENTOR
JOHN KELLY
BY
ATTORNEYS Dec. 12, 1961          J. KELLY          3,012,840
STRIP CAMERA AND TIMER AND PHOTOGRAPHS PRODUCED THEREBY
Filed Sept. 8, 1959          4 Sheets-Sheet 3
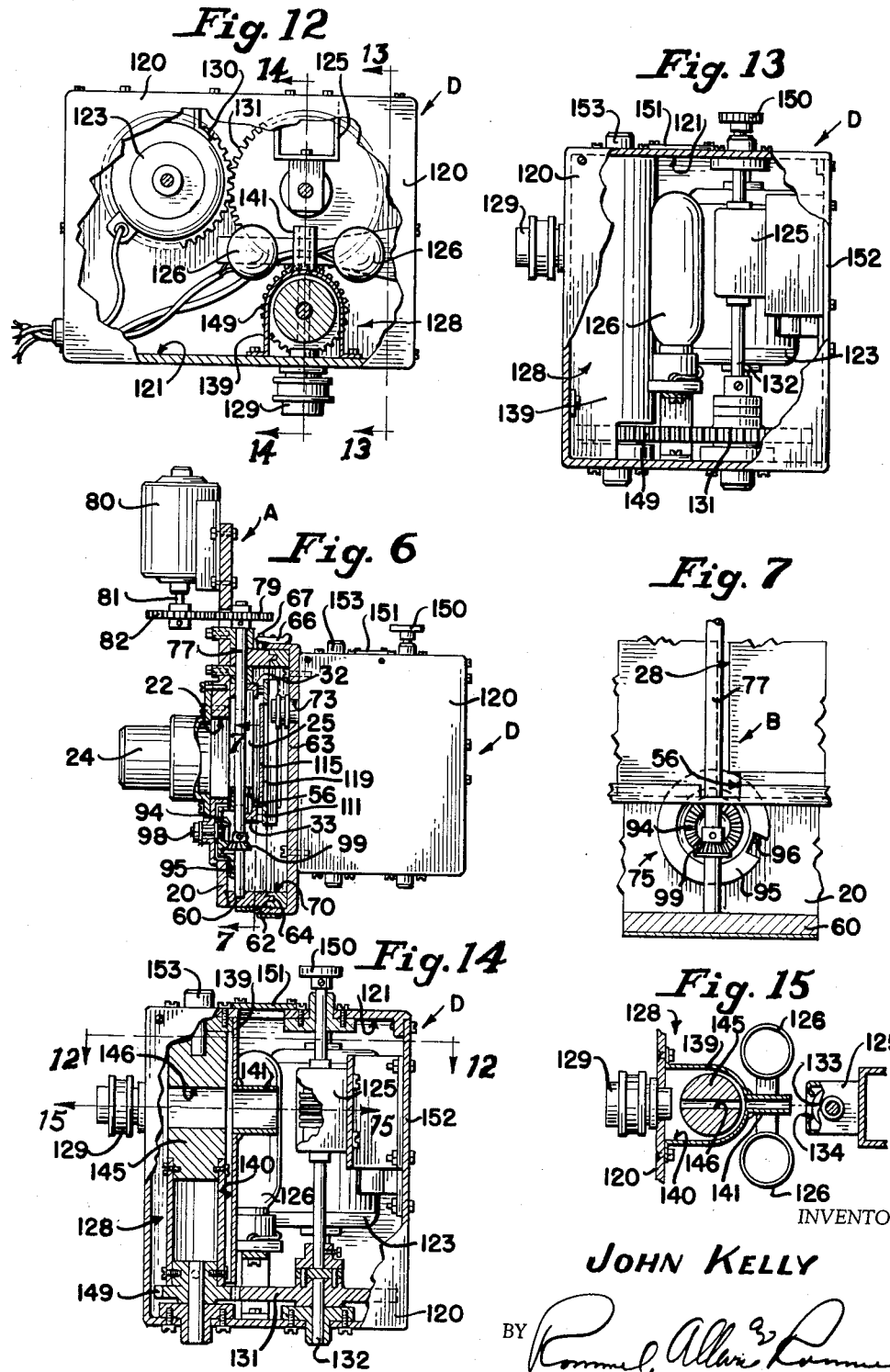
INVENTOR
JOHN KELLY
BY
ATTORNEYS Dec. 12, 1961  J. KELLY  3,012,840
STRIP CAMERA AND TIMER AND PHOTOGRAPHS PRODUCED THEREBY
Filed Sept. 8, 1959  4 Sheets-Sheet 4
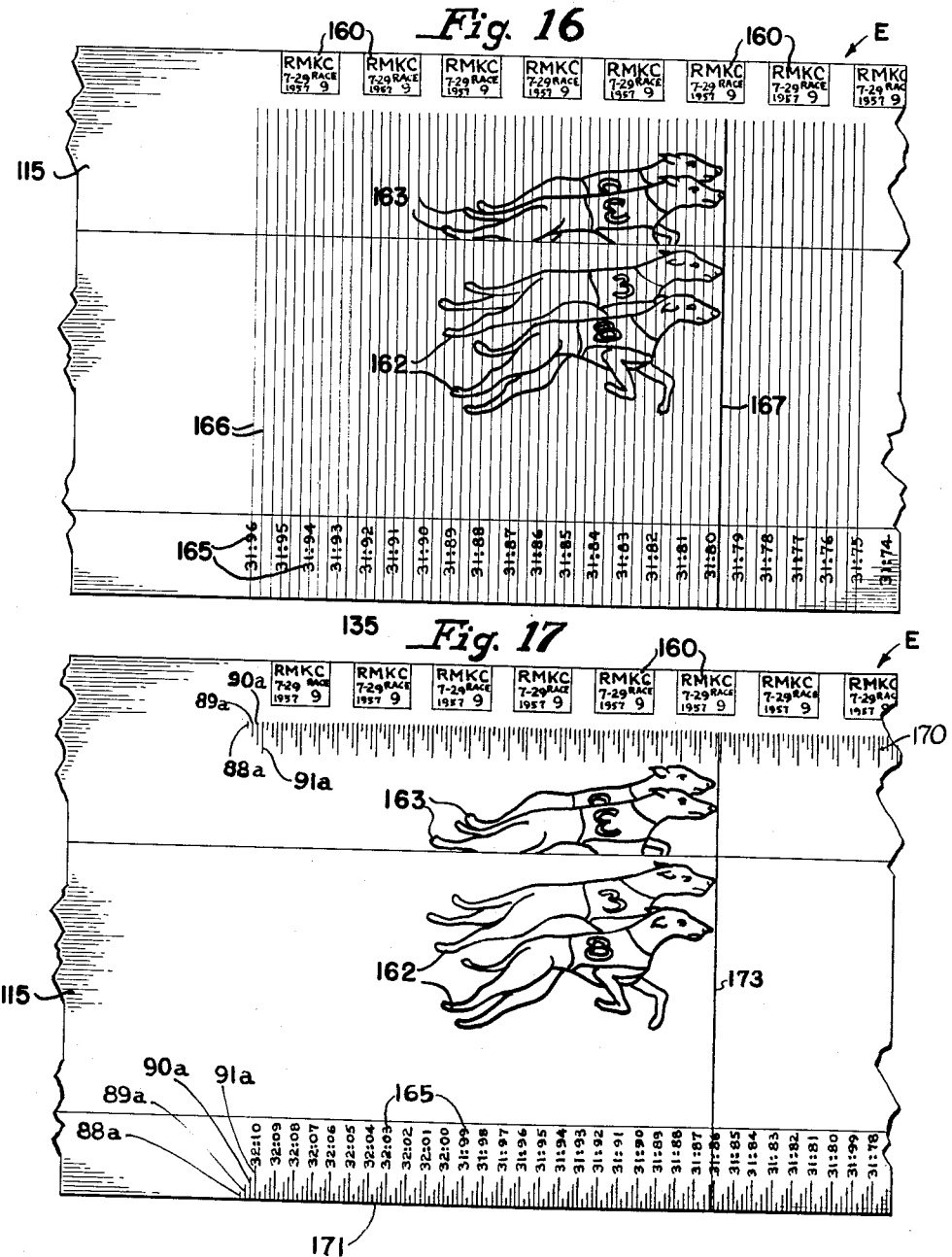
INVENTOR
JOHN KELLY
BY
ATTORNEYS ial at the United States Patent Office 3,012,840
Patented Dec. 12, 1961

3,012,840
STRIP CAMERA AND TIMER AND PHOTO-
GRAPHS PRODUCED THEREBY
John Kelly, 942 Almeria Road, West Palm Beach, Fla.
Filed Sept. 8, 1959, Ser. No. 838,458
11 Claims. (Cl. 346—107)

This invention relates to improvements in strip cameras, timers therefor and photographs produced thereby.

In order to determine the proper sequence in which contestants in various types of races such as foot races, horse races, dog races, etc., cross the finish line, so that it can accurately be determined which contestant finished first, which second, which third, etc., there has long been sought an accurate camera whereby this order of finish could be provably photographed. At first it was thought that the standard motion picture camera could perform this function, however, it was soon discovered that in this type of camera the series of photographs of contestants crossing the finish line would frequently be a sequence wherein several contestants were just short of the finish line in one frame and just past the finish line in the next frame, so that it was impossible to determine from such a photograph exactly which contestant had crossed the finish line first. There was then developed the strip camera wherein the camera was stationed directly at the finish line with the shutter thereof continuously opened, with the film continuously moving across the shutter at a speed approximating that of the contestants. In this conventional type of strip camera, with the film continuously moving, it was impossible to photograph the actual finish line and an artificial finish line had to be placed on the film, usually by a second exposure of the film to a revolving drum upon which were placed a series of parallel lines, as shown in the patent to J. J. Jones, Patent No. 2,482,621, dated September 20, 1949. Strip cameras of this type have proven inaccurate due to the fact that the artificial finish line was frequently not superimposed on the film absolutely parallel to the actual finish line and it was impossible to provably ascertain whether or not this artificial finish line was actually parallel to the actual finish line after the film had been exposed. These conventional strip cameras therefore opened the door to suspicion and public confidence in the photo finish pictures taken by these strip cameras has considerably declined, with the result that race track operators are seeking a means of proving that the photographs are truthful representations of race finishes. It can readily be seen that an artificial finish line could be applied to the film at an angle so that in a close race the contestant who actually finished second would be shown as finishing first on the photograph, or to give the impression the appearance of a dead heat. Therefore, in order to establish a true order of finish of contestants upon the photographic film there must first be established exposures of the actual finish line to the film so that it is impossible to tilt or twist the film in any way in order to produce an incorrect winner of a race.

The primary object of my invention is the provision of a strip camera wherein the actual finish line is photographed at spaced intervals upon the film. Inasmuch as some track operators will desire that the finish line be photographed entirely across the film and other operators will only require that short segments of the finish line be exposed to each side of the film, a reproduced finish line being drawn to extend between these segments during enlargement of the film, I have provided two types of shutters that may be utilized with my strip camera so that the actual finish line may be photographed in either of these two ways.

A further object of my invention is the provision of an improved date board shutter that is cooperatively mounted with respect to the finish line shutter so that the date board placed on the track is intermittently photographically exposed to the film.

A further object is the provision of adjustable aperture plates for adjusting the width of the aperture through which the contestants and the finish line are photographed. This permits a fine adjustment of the aperture so that the actual finish line and contestants may be accurately photographed.

A further object is the provision of an adjustable and reversible dateboard segment that can be adjusted to receive dateboard images of varied sizes (horizontally) and can be reversibly positioned so that the dateboard images can be received upon either the upper or lower portion of the film.

A further object is the provision of a camera having a hinged rear gate so that the operator thereof can accurately align the actual finish line with the aperture through which the finish line and contestants are photographed.

A further object is the provision of an improved timer for photographically reproducing on the film the elapsed time of the race.

A further object is the provision of an improved photograph of a race wherein there is shown thereupon a plurality of images of the actual finish line so that the actual order of finish of the contestants may be accurately determined.

Other objects and advantages of the invention will be apparent during the course of the following detailed description, taken in connection with the accompanying drawings, forming a portion of this specification and in which drawings:

FIG. 1 is an exploded top plan view of my improved camera.

FIG. 2 is a front plan view of the camera with the lens removed.

FIG. 3 is an enlarged fragmentary sectional view taken substantially on the line 3—3 of FIG. 1.

FIG. 4 is an enlarged fragmentary sectional view taken substantially on the line 4—4 of FIG. 3.

FIG. 5 is a rear view of the camera with the rear gate thereof opened.

FIG. 6 is a vertical sectional view taken substantially on the line 6—6 of FIG. 2 with the lens of the camera in place.

FIG. 7 is an enlarged fragmentary sectional view taken substantially on the line 7—7 of FIG. 6.

FIG. 8 is a fragmentary view of one form of rotary shutter for photographing the actual finish line that may be used in my improved camera.

FIG. 9 is a transverse sectional view taken substantially on the line 9—9 of FIG. 8.

FIG. 10 is a fragmentary view of another type of rotary shutter that may be utilized with my improved camera.

FIG. 11 is a transverse sectional view taken substantially on the line 11—11 of FIG. 10.

FIG. 12 is a top plan view of my improved timer, with parts thereof broken away to disclose the preferred details.

FIG. 13 is a fragmentary sectional view taken substantially on the line 13—13 of FIG. 12.

FIG. 14 is a fragmentary sectional view taken substantially on the line 14—14 of FIG. 12.

FIG. 15 is a fragmentary sectional view taken substantially on the line 15—15 of FIG. 14.

FIG. 16 is a fragmentary section of a photograph taken with the type of rotary shutter shown in FIG. 8.

FIG. 17 is a fragmentary section of a photograph taken with the shutter shown in FIG. 10.

In the drawings, wherein for the purpose of illustration is shown a preferred and modified form of the invention, and wherein similar reference characters designate corresponding parts throughout the several views, my improved camera preferably includes a frame A, shutter means B, film feeding and guide means C, and timing means D, which operate to produce a photograph E.

The frame A of the camera preferably includes a base plate 20 that supports the camera structure. This base plate 20 is provided with a polygonal opening 22 substantially centrally thereof, a lens mounting plate 23 disposed in juxtaposition with respect to the opening 22, a lens 24 mounted upon the lens mounting plate 23, aperture plates 25 and 26 movably mounted upon the opposite side of the base plate 20 from the lens 24, and dateboard segment 27 mounted immediately below the aperture plate 25. The aperture plates 25 and 26 are spaced apart to define an image aperture 28, the aperture image spacing of the plates 25 and 26 being regulated by the aperture adjusting means 30. The lens 24 may be of any conventional type and may be removably attached to the lens mounting plate 23.

The supporting structure for the aperture plates 25 and 26 include a pair of spaced apart, grooved guide plates 32 and 33 that are disposed to each of the upper and lower sides of the plates 25 and 26, the aperture plate 26 being slidably supported within the grooves 34 thereof and the aperture plate 25 being slidably supported at its uppermost portion within the groove 34 of the guide plate 32 and slidably supported at its lowermost portion by the dateboard segment 27.

In the drawings I have shown the aperture plate 26 as having a slotted opening 36 disposed horizontally thereof, and a screw 37 secured through the slot 36 to the base plate 20, which screw 37 may be loosened and the aperture plate moved horizontally between the guide rails 32 and 33 to the desired position whereupon the screw 37 will be tightened. The aperture plate 25 has been shown as including a vertical slot 38 which cooperates with the aperture adjusting means 30.

The aperture adjusting means 30 preferably includes an adjusting rod 39 that is rotatably supported upon the base plate 20 by the brackets 40 and 41, the bracket 40 being provided with an internally threaded opening that cooperates with the threads 42 of a handle 43 mounted at one end of the adjusting rod 39, so that by threading of the threads 42 into or out of the bracket 40 the adjusting rod 39 will be moved horizontally with respect to the base plate 20. Adjusting rod guides 45 and 46 may be mounted upon the base plate 20 to guide the rod 39 and a pair of springs 48 and 49 may be mounted upon the adjusting rod 39, with one end thereof secured to the base plate 20, for maintaining the rod 39 in its proper position. The rod 39 is provided, at the end thereof opposite the threaded handle member 43, with a hook-like projection 50 that extends into and cooperates with the slot 38 provided in aperture plate 25.

It will be seen from this construction that the spacing between the aperture plates 25 and 26, which spacing defines the image aperture 28, may be easily adjusted, first by movement of the aperture plate 26 into its proper position, whereupon this plate is secured into position by tightening of the screw 37 and by tightening of the clamps 53 mounted upon the guide rails 32 and 33, and the aperture plate 25 then moved to its proper position by means of the adjusting rod 39. In the event that the camera is to receive various lenses in a short period of time the adjusting rod 39 will be used to adjust the aperture plate 25 with respect to plate 26 in order to provide for the proper image aperture 28, however, when the camera is to be secured in a fixed position and only one type of lens is to be used thereupon, this adjusting rod 39 may be initially set so that the aperture plate 25 is in its proper position, whereupon the clamps 55 mounted upon the guide rails 32 and 33 may be tightened, which clamps 35 will securely hold the aperture plate 25 in position.

The dateboard segment 27 is somewhat shorter in length than the aperture plate 25 and is slidably received within the slot 34 of the guide rail 33 immediately below the aperture plate 25, providing a dateboard opening 56. Inasmuch as the dateboard segment 27 is horizontally movable independent of the aperture plate 25 it is obvious that the dateboard opening 56 may be adjusted to the desired horizontal width without effecting the image aperture 28. The dateboard segment 27 may be securely fastened in position by tightening the clamp 55.

It is obvious that the dateboard segment 27 can be reversed by placing it at the uppermost portion of the aperture plate 25, a position reversed from that shown in FIG. 3, so that the dateboard opening 56 is above the aperture opening 28, with the dateboard segment 27 slidably received within the groove 34 of the guide rail 32 and the aperture plate 25 slidably supported within the groove 34 of the guide rail 33.

Mounted upon the rear of the base plate 20, opposite the lens 24, I have provided a film frame 60 that is preferably of a substantially rectangular configuration and which has hingedly mounted thereon, as by the hinge 62, a rectangular gate 63. The frame 60 and gate 63 are of substantially the same rectangular dimensions, the frame 60 being provided with a tongue 64 that interfits within the tongue 65 provided on the gate 63, so that an effective light seal is provided when the gate 63 is closed upon the frame 60 with the tongue 64 interfitting within the groove 65. A latch 66 may be provided upon the gate 63 that interconects with a lug 67 mounted upon the frame 60 so that the gate 63 may be firmly held in position upon the frame 60. A portion of both the frame 60 and the gate 63 are cut away at opposed sides thereof, to provide a passageway for the film through the chamber 70 defined by the frame 60 and the gate 63, and conventional light trapping means 72 are provided upon these passageways to prevent the entry of light within the chamber 70. An opening 73 is provided within the top of the gate 63, for receiving the lens of the timer D as will be subsequently described.

Mounted upon the base plate 20, and extending to within the chamber 70, is the shutter means B which includes a rod type rotary shutter 74 and a disc type rotary shutter 75.

The rod type shutter 74 will be designed so that the length of the actual finish line desired to be photographically reproduced upon the film will be exposed thereto, and in FIGS. 8 and 9 I have disclosed one type of rod shutter 76 for reproducing photographic images of the actual finish line substantially acros the film, as shown in FIG. 16, and in FIGS. 10 and 11 I have shown another type of rod shutter 78 for reproducing photographic images of varied lengths of the actual finish line to each side of the film, as shown in FIG. 17. The rod shutter 76 disclosed in FIGS. 8 and 9 is shown in the various other figures including the camera and the rod shutter 78 appears only in FIGS. 10 and 11. It is apparent that the rod shutter 78 disclosed in FIGS. 10 and 11 may be substituted for that shown in FIGS. 8 and 9.

The rod shutter 74 comprises an elongated cylindrical body portion 77 that is rotatably supported within the chamber 70 and extends across and adjacent the aperture image opening 28, the rod shutter 74 being mounted within the chamber 70 intermediate the aperture plates 25 and 26 and the base plate 20. Thus, a portion of any image that is transmitted through the lens 24, and through the opening 22 in the base plate 20, may be regulated by the rod shutter 74 before the image pases through the image aperture 28. The rod 77 extends upwardly through the film frame 60, and has mounted on the uppermost end thereof a spur gear 79. A motor 80 is mounted upon the base plate 20, preferably to the same side thereof as the lens 24, which motor 80 has a shaft 81 that has secured thereto a spur gear 82 that meshes with the spur gear 79 mounted upon the rod 77. The motor 80 will thus rotate the rod 77 at a predetermined speed for exposure of the finish wire to the film at predetermined intervals, as will be subsequently described.

In the rotary rod shutter 76 shown in FIGS. 8 and 9, the rod 77 is provided with an elongated flattened side recess 85, which recess 85 extends for substantially the entire length of the image aperture 28. Thus, when the camera is aligned with the finish line so that the image thereof passes substantially through the recessed portion 85 of the rod 77 when the same is turned parallel therewith, the image of the finish line will then pass through the lens 24, through the opening 22, through the recessed portion 85, through the aperture image opening 28 and be exposed to the film. When the rod 77 is turned so that the recessed portion 85 is other than parallel to the finish line the image of the finish line will be cut off from the film by the main cylindrical body portion 77. Thus, by rotating the rod 77 at a predetermined speed the finish line will be intermittently exposed to the film through the recessed portion 85 and render an image of the actual finish line upon the film substantially as shown in FIG. 16.

In the rotary rod shutter 78 shown in FIGS. 10 and 11 the rod 77 is provided with varied lengths of recessed portions to each end thereof so that varied lengths of the finish line will be exposed to the film. Both the upper and lower portions of the rod are provided with identical recessed portions and therefore only those appearing on the uppermost end wil be described. Preferably the recessed portions are provided in substantially a rectangular shape about the rod 77, as shown in FIG. 11, the rod 77 first being provided with a relatively short recessed portion 88 upon one side thereof, a second recessed portion 89 that is somewhat longer than the first recessed portion 88 and is substantially normal thereto, a third recessed portion 90 that is substantially longer than the recessed portion 89 and is normal thereto, a fourth recessed portion 91 that is longer than the recessed portion 90 and is normal to the recessed side 90. These recessed portions are situated upon the rod 77 so that they begin at substantially the edges of the aperture opening 28 and extend upwardly from the edges thereof. The operation of this type of rod shutter is the same as that described with respect to FIGS. 8 and 9, the camera being aligned so that the image of the finish line will pass through one of the recessed portions when it is parallel thereto, the finish line being cut off from passage through the image aperture 28 when the rod is turned into a position so that no one of the recessed portions is parallel thereto. The provision of such a rod shutter upon the camera will result in images of the finish line as shown in FIG. 17.

The rotary disc type shutter 75 preferably includes a central body portion 93 provided with a bevel gear 94 and a flanged outer body portion 95 provided with an opening 96. The disc shutter 75 is mounted upon the base plate 20 by means of a conventional rod and bearing construction 98 and is positioned thereupon so that the flange 95 of the disc extends over and covers the dateboard opening 56 provided in the aperture plate 25, the rotation of the disc intermittently bringing the opening 96 into alignment with the opening 56, whereupon the dateboard will be exposed therethrough and onto the film. A bevel gear 99 may be mounted upon the rod 77, which bevel gear 99 meshes with the bevel gear 94 of the disc shutter 75 and thereby rotates the disc shutter. A separate means for rotating the disc shutter could be provided, inasmuch as it is not necessary to have the dateboard exposed to the film as frequently as the finish wire, however, I have discovered that it is a unique and compact structure to mount the dateboard disc shutter and the finish wire rod shutter so that they may be operated from a single power source. When the disc shutter is rotated so that the opening 96 thereof coincides with the opening 56 of the aperture plate 25, an image of the dateboard will pass through the lens 24, through the opening 22, through the opening 96, through the opening 56, through the image aperture 28, and thence to the film.

In driving of the disc shutter 75 by the rod 77 it is obvious that coupling structures other than a bevel gear train may be provided. For instance, I may provide a friction ring about the rod 77 and the disc shutter 75 may be completely flat and mounted so that one surface thereof is spring urged against the friction ring. Contact between the friction ring and the face of the disc shutter will thus provide for rotation of the disc shutter by the rod 77 and if it is desired to adjust the speed of the disc shutter the friction ring can be moved on the rod 77 so that it will contact the face thereof at either a greater or less distance from its periphery, thus slowing down or speeding up rotation of the disc shutter while maintaining the rod 77 at a set rotational speed.

The motor 80 is preferably electric, and any conventional switch 100 may be provided for actuating the same. A rheostat 101 is preferably provided for regulating the speed of the motor 80.

The film feeding means C preferably includes a conventional film magazine 106 that is secured to the base plate 20 and is placed adjacent to the film frame 60 so that film 115 may be fed from the film magazine 106, through one of the light traps 72, and into the chamber 70. Mounted upon the guide rails 32 and 33, within the chamber 70, to either side of the image aperture 28, are a pair of film guiding tension bars 107 and 108. These bars 107 and 108 extend in a spaced relationship over the aperture plates 25 and 26, and are provided on the uppermost surface thereof with film guide lugs 109. A pressure plate 111 is mounted upon the guide rails 32 and 33 intermediate the tension bars 107 and 108 and is provided with a projecting central portion which contacts the film and cooperates with the bars 107 and 108 in the proper tension on the film. The central portion of the pressure plate 111 is provided with an elongated slotted opening 119 for exposure of the timer to the film, as will be subsequently described.

Mounted to the opposite side of the film frame 60 from the film magazine 106 are a pair of drive rolls 112 and 113 that cooperatively engage the film 115 therebetween and move the same from the film magazine and through the chamber 70. These drive rolls 112 and 113 are mounted upon the base plate 20 and driven by a motor 116, the motor 116 being preferably synchronized through the rheostat 101 so that the speed of rotation of the rollers 112 and 113, and correspondingly the speed of flow of the film 115 through the box 70 will be correlated withe the speed of rotation of the rod shutter 74 and the disc shutter 75. Any form of conventional light proof film receptacle and winding reel may be provided for the reception of the film, which film receptacle will extend over the drive rolls 112 and 113 and into substantial abutment with the light trap 72 at that side of the chamber 70, so that the film passes directly from the chamber 70 to within the film receptacle, without exposure to unwanted light.

It will thus be seen from such film guiding and feeding means that the film 115 is fed directly from the film magazine 106 into the chamber 70, over the film tension bar 107, under the pressure plate 111, over the tension bar 108, and thence to the film receptacle (not shown). The film is thus positioned and guided at a predetermined speed past the image aperture 28 and the dateboard opening 56, so that continuous images of the contestants are exposed to the film up until the time that they actually cross the finish line, the image of the dateboard being intermittently exposed to the film through opening 96 as the disc shutter 75 rotates, and the image of the actual finish line being intermittently exposed to the film through the recess 85 as the rod shutter 74 rotates.

The timer D preferably includes a casing structure 120 that defines a chamber 121. Housed within the chamber 121 are a motor 123, a counter 125, lights 126, and exposure means 128 that permit intermittent exposure of the counter 125 through the lens 129 and onto the film 115. The motor 123 is provided with a gear 130 that meshes with the gear 131 mounted upon a shaft 132 connected to the counter 125. The motor 123 thus drives the counter 125. The motor 123 is preferably a synchronized electrical motor that will drive the counter accurately so that timing indicia are exposed to count off one one-hundredths of a second. The counter is provided with indicia 133 that is appropriately exposed through the opening 134 of the counter as the time intervals elapse. The lights 126 are disposed in front of and to each side of the opening 134 of the counter and illuminate the indicia 133.

The exposure means 128 includes a casing having a main body portion 139 that defines a chamber 140 therewithin. Mounted upon one side of the main body portion 139 is a projecting conduit 141 that is disposed immediately opposite the opening 134 of the counter 125 so that the indicia 133 will be directly exposed thereinto and the image of the indicia can pass therethrough and into the chamber 140. Mounted within the chamber 140 is a rotary shutter 145 that has an opening 146 therethrough, which opening 146 is directly aligned with the opening through the conduit 141. The shutter 145 has mounted thereupon a gear 149 that meshes with the gear 131 of the counter 125, so that rotation of the shutter 145 is synchronized with rotation of the counter 125. Therefore, each time that a new indicia is exposed by the counter in sequences of normally one one-hundredths of a second, the opening 146 of the shutter 145 will be aligned with the opening through the conduit 141, so that the image of the indicia 133 will pass through the opening in the conduit 141, through the opening 146 of the shutter 145, and through the lens 129.

A reset knob 150 is secured to the counter and projects therefrom outwardly of the casing structure 120 so that the timer may be reset so that it will accurately indicate the elapsed time of the race and the elapsed time that it took each of the contestants to cross the finish line. A removable cover 151 may also be provided on the casing 120 for the replacement of the lights in the event that the same burn out, and a removable cover 152 may be provided on the rear of the casing for repair and/or replacement of any of the operative parts. A synchronizing knob 153 may be attached to the shutter 145 providing for adjustment of the shutter so that the opening 146 can be properly synchronized with the turning of the counter indicia.

In the mounting of the timer upon the gate 63, the lens 129 is placed so that it extends into the opening 73 and the timer is secured to the gate 63. The lens 129 is such that the image of the counter 125 will be projected therethrough and through the slot 119 in the pressure plate 111 to the rear of the film 115, i.e., to the opposite side of the film from that which is exposed to the contestants, the image of the counter being projected upon the film so that it will be in proper relationship to the remainder of the photographic images recorded thereon. It is a well known fact that photographic images may be impressed upon a film from either side thereof, by the utilization of appropriate lenses.

The operation of the device is as follows:

Assuming that the rotary rod shutter 76 shown in FIGS. 8 and 9 is mounted within the camera, the camera is first aligned with the actual finish line that is designated by the letters FL in FIG. 1, so that the leading edge of the actual finish line, in the direction from which the contestants are to approach, is aligned with the periphery of the rod 77 that is in the direction from which the contestants are to approach the finish line. The dateboard posted on the track is then aligned so that the image thereof will be projected through the opening 56 of the aperture plate 25. The aperture plates are then adjusted so that the proper image aperture 28 is provided for the type of lens that is being used, and the aperture plates 25 and 26 secured in position. The film is then fed from the magazine 106, over the tension bar 107, under the pressure plate 111, over the tension bar 108, onto the drive rolls and into the film receptacle. The timer is then set to zero and secured to the gate 63, and the gate closed. A short length of film is then run through the camera so that the portion that had been exposed when the gate was open is removed from the chamber 70 and only unexposed film remains in this chamber. Inasmuch as the film will need to pass through the camera only as the contestants approach the finish line, it is not necessary to continuously run the film, however, it is desired to accurately record the total elapsed time of the race, and therefore the timer motor is preferably actuated separately from the film feeding mechanism. Therefore, assuming that a race is starting the timer is actuated at the instant of the start of the race, and as the contestants near the finish line the motors 116 and 80 are actuated, feeding the film through the camera at approximately the same speed as the contestants approach. The rotation of the rod shutter 76 exposes the actual finish line to the film through the recessed portion 85 at intermittent intervals, the rotation of the disc shutter 75 exposes the dateboard to the film through the opening 56 at intermittent intervals and the shutter 145 exposes the time indicia to the film through the opening 146 at intermittent intervals superimposing on the film images of the requisite data. The contestants will therefore be photographed from the time that they approach the finish line until they actually cross thereover. As a contestant crosses the finish line the finish line cuts off his image. Therefore there will be recorded on the film an image of the contestant up until the time that he actually crosses the finish line and the leading contestant on the film will be the winner of the race. Although the leading contestant in FIG. 16 has been shown as crossing the finish line at a point that exactly coincides with the exposure of the actual finish line upon the film, it is to be understood that more often than not the nose of the leading contestant will fall intermediate the exposures of the actual finish line. In such instances, by using the paralleled images of the actual finish line as a guide, a reproduced finish line may be drawn upon the negative that will be absolutely parallel to the actual finish line, which reproduced finish line will be drawn so that it just touches the nose of the leading contestant. Such reproduced finish line is drawn upon the negative in absolute parallelism with the actual finish line, so that when the photograph is exhibited to the general public the finish line that has been drawn in abutment with the nose of the leading contestant will be seen to be in absolute parallelism with the actual finish line and the winner of the race provably designated and there can be no dispute as to the winner of the race by virtue of the reproduced finish line that is drawn thereon being out of parallelism with the actual finish line.

The varied lengths of images of the actual finish line that are shown in FIG. 17 will be accurately aligned so that a line that is absolutely parallel to the actual finish line can be drawn thereacross by using the images of the actual finish line in establishing parallelism, such reproduced finish line being drawn thereacross in abutment with the nose of the leading contestant as was previously described with respect to FIG. 16.

There will therefore result, from utilization of the rod shutter as shown in FIGS. 8 and 9 in my improved camera, a photograph similar to that disclosed in FIG. 16 having images 160 of the dateboard at the upper portion of the photograph; images 162 of the contestant's side nearest the camera in the central portion of the photograph; images 163 of the contestants that are reflected from the usual mirror that is disposed to the side of the track opposite the camera in order to give accurate images of both sides of a contestant; time images 165 disposed to the bottom of the photograph; images 166 of the actual finish line across the main body of the film. The reproduced finish line 167 can then be drawn in absolute parallelism with the images of the actual finish line 166.

In the photograph as shown in FIG. 17 the images of the dateboard, time and the contestants will be the same as that which has previously been disclosed with respect to FIG. 16, and therefore identical reference characters disposed to the lower portion of the film, the images of the finish line are disposed in segments of varied lengths, one of the segments 170 being disposed to the upper portions of the film and the other of the segments 171 being disposed to the lower potrion of the film, the images of the finish line being designated on this photograph as 88ª, 90ª, and 91ª, corresponding to the recessed portion of the rod 77 through which the images passed. The images 88ª, at the upper portion of the film will be directly opposite the images 88ª at the lower portion of the film, the images 89ª at the upper portion of the film directly opposite the images 89ª at the lower portion of the film, etc., so that a reproduced finish line 173 can be drawn in abutment with the nose of the leading contestant, which reproduced finish line 173 will be provably absolutely parallel with the actual finish line, such parallelism being guided and determined by the images of the actual finish line thereupon.

Various changes may be made to the form of the invention herein shown and described without departing from the spirit of the invention or scope of the following claims.

I claim:

1. In a camera for photographically recording the sequence in which a plurality of contestants cross a finish line, the combination of a frame having an opening therein; means mounted upon said frame for moving a film through said camera and past the opening in said frame; lens means mounted upon the opposite side of said frame from said first mentioned means for transmitting an image of the contestants through the opening in said frame and onto the central area of said film; aperture means defining an image aperture mounted upon said frame adjacent the opening in said frame, intermediate said film and the opening in said frame, for regulating the field of exposure of said film; rod shutter means rotatably mounted on said frame intermediate said film and the opening in said frame, said rod shutter means having an outer periphery extending over a portion of said image aperture for limiting the field of exposure therethrough, said outer periphery of said rod shutter means having a recessed portion extending substantially the length of said image aperture; the outermost side of said recessed portion extending in substantial alignment with one side edge of said image aperture and spaced from the other side edge thereof so that substantially a full field of exposure through said image aperture is afforded when said recessed portion of said rod shutter means is in alignment with said one side edge of said image aperture; and means mounted on said frame for rotating said rod shutter means so that a portion of the objective of said camera will be exposed to said film through said recessed portion of said rod shutter means as said rod shutter means is rotated to a position wherein the outermost side of said recessed portion is in alignment with said one side edge of said image aperture and this same portion of the objective will be cut off from exposure to said film by the outer periphery of said rod shutter means when the outermost side of said recessed portion is rotated to a position other than in alignment with said one side edge of said image aperture, providing intermittent exposure to said film of a portion of the objective.

2. The combination as specified in claim 1 wherein the outer periphery of said rod shutter means is provided with a plurality of recessed portions thereabout, with peripheral portions intermediate said recessed portions extending over a portion of said image aperture for limiting the field of exposure therethrough, the outermost side of each of said recessed portion extending in substantial alignment with one side edge of said image aperture and spaced from the other side edge thereof, so that a portion of the objective will be exposed to said film by the alignment of each of said recessed portions with said one side edge of said image aperture and this same portion of the objective will be cut off from exposure to said film by said peripheral portions when no one of said recessed portions is in alignment with said one side edge of said image aperture.

3. The combination as specified in claim 2 wherein said recessed portions extend in a stepped relationship substantially adjacent only the uppermost and lowermost portions of said image aperture with the full outermost periphery of said rod shutter means extending therebetween, so that a portion of the objective of the camera is completely cut off at all times from exposure to the central area of said film by said outermost periphery and a portion of the objective of the camera is intermittently exposed adjacent each side edge of said film by said stepped recessed portions.

4. In a camera for photographically recording the sequence in which a plurality of contestants cross a finish line, the combination of a frame having an opening therein; means mounted upon said frame for moving a film through said camera and past the opening in said frame; lens means mounted upon the opposite side of said frame from said first mentioned means for transmitting an image of the contestants through the opening in said frame and onto the central area of said film; aperture means defining an image aperture mounted upon said frame adjacent the opening in said frame, intermediate said film and the opening in said frame, for regulating the field of exposure of said film; rod shutter means rotatably mounted on said frame intermediate said film and the opening in said frame, said rod shutter means having an outer periphery extending over a portion of said image aperture for limiting the field of exposure therethrough, the outer periphery of said rod shutter means having a recessed portion extending longitudinally thereof, said image aperture being positioned to receive an image of the contestants as they approach the finish line and at least a portion of the actual finish line, and said rod shutter means being positioned so that the outer periphery thereof will cut off the image of said finish line from exposure through said image aperture and, upon rotation of said rod shutter means, at least a portion of the image of said finish line will be exposed through said image aperture when said recessed portion of said rod shutter means is in alignment with at least a portion of the longitudinal length of said finish line; and means mounted on said frame for rotating said rod shutter means so that said recessed portion will be continuously rotated into and out of alignment with at least a portion of the longitudinal length of said finish line, providing intermittent exposure of at least a portion of the image of said finish line through said image aperture and onto said film.

5. The combination as specified in claim 4 wherein said aperture means comprises a pair of plates defining said image aperture therebetween, each of said plates being individually slidably movable with respect to said frame so that the width of said image aperture can be adjusted according to the focal length of said lens means, one of said aperture plates having adjusting means attached thereto extending outwardly of said frame whereby the width of said image aperture between said aperture plates can be readily adjusted.

6. The combination as specified in claim 4 wherein said aperture means defines an image aperture and a date board aperture, and wherein a disc shutter is mounted upon said frame intermediate said film and the opening in said frame, said disc shutter having a peripheral portion extending over said date board aperture and having a cutaway portion in said peripheral portion substantially coinciding with said date board aperture, so that a date board may be positioned adjacent said finish line and the image of the date board will be intermittently exposed to said film through said cutaway portion of said disc shutter and said date board aperture when said cutaway portion of said disc shutter is in alignment with said date board aperture and the image of the date board will be cut off from exposure to said film when said cutaway portion of said disc shutter is other than in alignment with said date board aperture, and means mounted on said frame for continuously rotating said disc shutter so that said cutaway portion of said disc shutter will be intermittently aligned and misaligned with said date board aperture, providing intermittent exposure of the date board to said film.

7. The combination as specified in claim 6 wherein said disc shutter is cooperatively geared to said rod shutter means for cooperative rotation therewith.

8. In a camera for photographically recording the sequence in which a plurality of contestants cross a finish line, the combination of a frame having an opening therein; means mounted upon said frame for moving a film through said camera and past the opening in said frame, said means including a film magazine having a roll of film therein mounted upon said frame, drive means for pulling said film from said film magazine and across the opening in said frame, a first tension bar mounted upon said frame to one side of the opening in said frame, a second tension bar mounted upon said frame to the other side of the opening in said frame, each of said tension bars being provided with guide lugs for centering said film as said film moves across the opening in said frame, and a pressure plate mounted upon said frame intermediate said tension bars, said film moving from said film magazine over said first tension bar, beneath said pressure plate and across the opening in said frame, over said second tension bar, and through said drive rolls; aperture means defining an image aperture mounted upon said frame adjacent the opening in said frame, intermediate said film and the opening in said frame, for regulating the field of exposure of said film; rod shutter means rotatably mounted on said frame intermediate said film and the opening in said frame, said rod shutter means having an outer periphery extending over a portion of said image aperture for limiting the field of exposure therethrough, the outer periphery of said rod shutter means having a recessed portion extending longitudinally thereof, said image aperture being positioned to receive an image of the contestants as they approach the finish line and at least a portion of the actual finish line, and said rod shutter means being positioned so that the outer periphery thereof will cut off the image of said finish line from exposure through said image aperture and, upon rotation of said rod shutter means, at least a portion of the image of said finish line will be exposed through said image aperture when said recessed portion of said rod shutter means is in alignment with at least a portion of the longitudinal length of said finish line; and means mounted on said frame for rotating said rod shutter means so that said recessed portion will be continuously rotated into and out of alignment with at least a portion of the longitudinal length of said finish line, providing intermittent exposure of at least a portion of the image of said finish line through said image aperture and onto said film.

9. In a camera for photographically recording the sequence in which a plurality of contestants cross a finish line, the combination of a frame having an opening therein; gate means secured to said frame and cooperating with said frame to provide a lightproof enclosure with respect to said frame so that the only light entering into said enclosure passes through the opening in said frame; means mounted upon said frame for moving a film through said lightproof enclosure and past the opening in said frame; lens means mounted upon the opposite side of said frame from said first mentioned means for transmitting an image of the contestants through the opening in said frame and onto the central area of said film; aperture means defining an image aperture mounted within said lightproof enclosure and adjacent the opening in said frame; intermediate said film and the opening in said frame, for regulating the field of exposure of said film; rod shutter means rotatably mounted on said frame intermediate said film and the opening in said frame, said rod shutter means having an outer periphery extending over a portion of said image aperture for limiting the field of exposure therethrough, the outer periphery of said rod shutter means having a recessed portion extending longitudinally thereof, said image aperture being positioned to receive an image of the contestants as they approach the finish line and at least a portion of the actual finish line, and said rod shutter means being positioned so that the outer periphery thereof will cut off the image of said finish line from exposure through said image aperture and, upon rotation of said rod shutter means, at least a portion of the image of said finish line will be exposed through said image aperture when said recessed portion of said rod shutter means is in alignment with at least a portion of the longitudinal length of said finish line; means mounted on said frame for rotating said rod shutter means so that said recessed portion will be continuously rotated into and out of alignment with at least a portion of the longitudinal length of said finish line, providing intermittent exposure of at least a portion of the image of said finish line through said image aperture and onto said film; and timer means secured to said gate and aligned with said film for transmitting an image of timing indicia to the surface of said film opposite that upon which the image of the contestants is exposed.

10. The combination as specified in claim 6 wherein said aperture means includes a pair of aperture plates and a dateboard segment, said dateboard segment being mounted to one side edge of one of said aperture plates and slidable with respect thereto so that said dateboard aperture may be adjusted independently of said image aperture.

11. The combination as specified in claim 9 wherein said means mounted upon said frame for moving a film through said light-proof enclosure and past the opening in said frame includes a pressure plate mounted upon said frame in juxtaposition for maintaining the film in proper relationship with respect to said flange means, said pressure plate having an aperture therethrough substantially aligned with said image aperture and said timer means secured to said gate in juxtaposition for transmitting the image of the timing indicia through said aperture in said pressure plate so that said timing indicia is superposed upon the film in aligned relationship with respect to the image of said finish line exposed by said rod shutter means.

References Cited in the file of this patent

UNITED STATES PATENTS

| | | |
|---|---|---|
| 2,250,442 | Abell | July 29, 1941 |
| 2,320,350 | Riccio | June 1, 1943 |
| 2,785,945 | Kuprion | Mar. 19, 1957 |
| 2,785,946 | Kuprion | Mar. 19, 1957 |
| 2,813,468 | Jones | Nov. 19, 1957 |
| 2,819,942 | Goodling | Jan. 14, 1958 |
| 2,868,064 | Henkel | Jan. 13, 1959 |

UNITED STATES PATENT OFFICE

CERTIFICATE OF CORRECTION

Patent No. 3,012,840            December 12, 1961

John Kelly

It is hereby certified that error appears in the above numbered patent requiring correction and that the said Letters Patent should read as corrected below.

Column 9, line 7, for "disposed to the lower portion of the film," read -- have been applied. In this photograph --; line 11, for "potrion" read -- portion --; same column 9, line 13, after "88$^a$," insert -- 89$^a$, --.

Signed and sealed this 17th day of April 1962.

(SEAL)
Attest:

ESTON G. JOHNSON            DAVID L. LADD

Attesting Officer            Commissioner of Patents